United States Patent Office 3,147,318
Patented Sept. 1, 1964

3,147,318
METHOD OF PREPARING ELASTOMERIC BLEND OF BENZENE-SOLUBLE CHLOROPRENE POLYMER AND A CROSS-LINKED CHLOROPRENE POLYMER
Hans Jungk, Carrcroft, Wilmington, Del., assignor to E. I. du Pont de Nemours and Company, Wilmington, Del., a corporation of Delaware
No Drawing. Filed Apr. 17, 1962, Ser. No. 188,262
5 Claims. (Cl. 260—890)

This invention relates to novel elastomers and, more particularly, to easily processable elastomers comprising blends of chloroprene polymers.

It has long been known that chloroprene polymer elastomers may be increased in plasticity by being prepared in the presence of so-called modifying agents or by being treated, after their formation, with plasticizing agents. The control of plasticity, however, is not the whole answer to the problem of producing an elastomer which has good working properties. Elastomers in general do not completely retain the exact size and shape into which they are formed by rubber-working machinery. This characteristic, known as "nerve" or "elastic memory," is present in chloroprene polymers and somewhat interferes with their use in certain delicate operations such as the high-speed extrusion of complicated shapes.

It is an object of the present invention to provide an elastomer which may be easily processed. A further object is to provide such an elastomer comprising a blend of chloroprene polymers having greatly improved working properties as represented by a relatively low "die swell." A further object is to provide a process for the preparation of an improved elastomer comprising a blend of chloroprene polymers.

These and other objects are accomplished in accordance with this invention by an elastomeric composition comprising an intimate blend of (a) a solid, benzene-soluble chloroprene polymer and (b) a cross-linked polymer selected from the group consisting of polychloroprene and a copolymer of chloroprene and no more than 10 percent by weight, based on the total weight of the monomer, of another ethylenically unsaturated monomer copolymerizable therewith, the cross-linked polymer obtained by cross-linking said polymer while in latex form by reaction with an organic peroxy compound and a reducing agent, the maximum intrinsic viscosity (I.V.) of said cross-linked polymer latex being expressed according to the formula:

$$\text{Maximum I.V.} = 0.20 + \tfrac{5}{8}K$$

wherein K ranges from 0 to about 0.24 equivalent part by weight of standard mercaptan chain transfer agent per 100 parts by weight of monomer used to prepare said latex; the ratio of (a) to (b) on a weight basis being between about 1:4 and about 4:1.

*Component (a).*—The chloroprene polymers of component (a) are any of the conventional solid, benzene-soluble chloroprene polymers of the prior art. The term "chloroprene" used in this memorandum is the accepted name for the compound 2-chloro-1,3-butadiene. The chloroprene polymers may be prepared by polymerizing chloroprene, or a mixture of monomers consisting of chloroprene and up to about 50 percent, by weight, based on total weight of the monomer, of one or more ethylenically unsaturated monomers copolymerizable therewith, by well-known methods. See for example, the following U.S. patents: 1,950,436; 2,227,517; 2,321,693; 2,371,719; 2,463,225; 2,481,044; 2,494,087; 2,567,117; 2,576,009; 2,831,842; and 2,914,497. Unreacted monomer may be removed as described in U.S. 2,467,769. The preferred polymers are prepared by partial polymerization of the monomer composition in the presence of an aliphatic mercaptan having 4 to 18 carbon atoms, such as butyl mercaptan, octyl mercaptan, and dodecyl mercaptan, although other conventional chain transfer agents may be used. Examples of ethylenically unsaturated monomers copolymerizable with chloroprene are:

Vinyl aromatic compounds, such as styrene, the vinyl toluenes, and vinylnaphthalenes;

Aliphatic conjugated diolefinic compounds, such as 1,3-butadiene, isoprene, 2,3-dimethyl-1,3-butadiene, and 2,3-dichloro-1,3-butadiene.

Vinyl ethers, esters, and ketones; such as methyl vinyl ether, vinyl acetate, and methyl vinyl ketone;

Esters, amides and nitriles of acrylic and methacrylic acid, such as ethyl acrylate, methyl methacrylate, methacrylamide, and acrylonitrile.

By "solid" it is meant that the polymers of component (a) have a Mooney viscosity, ML 1+2.5 (100° C.) of at least 25, determined by ASTM Method D–1646–59T. By "benzene-soluble" it is means that the polymer will dissolve in benzene at room temperature. Benzene solubility may be demonstrated by known techniques. For example, a 2- to 3-gram sample will dissolve in about 250 ml. of benzene at room temperature within about 5 to 10 hours with mild agitation.

*Component (b).*—The cross-linked, benzene-insoluble chloroprene polymers of component (b) of the blend may be a homopolymer of chloroprene or a copolymer prepared by polymerizing a mixture containing at least 90 precent by weight of chloroprene, based on the total weight of the monomer, the remainder being an ethylenically unsaturated copolymerizable monomer which may be a monoolefinic compound or a conjugated diolefinic compound. Examples of suitable copolymerizable monomers includes those mentioned previously as being suitable comonomers in preparing the polymers of component (a).

Conventional techniques for chloroprene polymerization are used. Any of the conventional emulsifying agents may be used in making the monomer emulsion. These include the water-soluble salts, particularly the sodium, potassium or ammonium salts, of compounds of the following types: long-chain fatty acids; rosins and rosin derivatives such as wood rosin, tall oil rosin, disproportionated rosin, or partially polymerized rosin; higher alcohol sulfates; aryl sulfonic acids, such as nonylbenzenesulfonic acid; and formaldehyde condensates or aryl sulfonic acids, such as the condensation product of formaldehyde and naphthalenesulfonic acid.

The conventional free-radical type polymerization initiators are used, which are compounds capable of yielding free radicals in the polymerization system. These include, for example, compounds containing the peroxy radical. Examples of these are hydrogen peroxide, cumene hydroperoxide, and water-soluble salts of persulfuric acid, such as sodium persulfate, potassium persulfate, and ammonium persulfate. Other types of free-radical polymerization initiators which may be used are the azo compounds disclosed in U.S. 2,471,959, such as 2,2'-azobis(2-methylpropionitrile). Still others are the nitrogen fluorides or the sodium, potassium, or ammonium ferricyanides. In carrying out the polymerization, an aqueous solution of the polymerization initiator is usually added to an aqueous emulsion containing monomer, the emulsifying agent, and any desired modifying agents at such a rate that the desired rate of polymerization is maintained. Rate of polymerization is usually determined by following the change of specific gravity of the emulsion during the polymerization.

The polymerization may be carried out between 0° C. and 60° C., preferably between 40 and 55° C. The pH of the system may be slightly acidic, neutral, or in the alkaline range. However, it is preferred to conduct the polymerization at a pH ranging from 7 to 13.5.

The monomer content in the original aqueous emulsion is not critical but usually ranges from about 40 to about 55 percent of the weight of total polymerization system.

The polymerization may be carried out in the absence or presence of a chain-transfer agent as will be discussed in greater detail hereinafter.

Polymerization may be stopped by the addition of "short-stopping" agents such as a mixture of phenothiazine and 4-tert-butylcatechol, as described in U.S. 2,576,009. Excess monomer, if present, may be removed by steam stripping as disclosed in U.S. 2,467,769.

After the polymerization step has been completed, the polymer is cross-linked while still in the latex form, by being submitted to the action of an organic peroxy compound and a reducing agent. Such a system comprising an oxidizing agent and a reducing agent is usually referred to as a "redox" system.

Any organic peroxy compound may be used as the oxidizing agent. These include both organic hydroperoxides and organic peroxides. The organic hydroperoxides that are preferred are those having at least four carbon atoms, the tertiary hydroperoxides being especially preferred. These are compounds of the general formula.

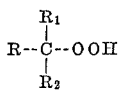

in which R, $R_1$, and $R_2$, which may be the same or different groups, are alkyl, cycloalkyl, aryl, alkaryl, or aralkyl radicals, or two or three of R, $R_1$, and $R_2$, together with the carbon attached to the hydroperoxy group, may form part of a ring system.

The organic peroxides are compounds of the formula

in which X and Y may be independently selected from the group acyl, alkyl, cycloalkyl, aryl, alkaryl, and aralkyl radicals.

The peroxy compounds may contain one or more of the peroxy groups, and may, in addition, contain such non-hydrocarbon substituents as oxygen in hydroxy or ether groups, sulfur in mercaptan or thioether groups, or halogen radicals.

Examples of suitable hydroperoxides are tert-butyl hydroperoxide, cumene hydroperoxide ($\alpha,\alpha$-dimethylbenzyl hydroperoxide), p-menthane, hydroperoxide, diisopropylbenzene hydroperoxide, pinane hydroperoxide, and 2,5-dimethyl-2,5-dihydroperoxyhexane. Examples of suitable organic peroxides are benzoyl peroxide, p-chlorobenzoyl peroxide, capryloyl peroxide, lauroyl peroxide, acetyl peroxide, dicumyl peroxide [bis($\alpha,\alpha$-dimethylbenzyl) peroxide], tert-butyl perbenzoate, methyl ethyl ketone peroxide, and cyclohexanone peroxide.

The reducing agent to be used in the process of this invention may be organic or inorganic. Any of the reducing agents known to be effective in redox polymerization initiator systems may be used. These include water-soluble salts, such as the alkali metal or ammonium salts of the following types: formaldehyde sulfoxylates, ferrocyanides, hydrosulfites, pyrosulfies, bisulfites.

Because organic peroxy compounds are relatively slow acting under the conditions used in this process, it is beneficial to add other oxidizing agents to accelerate the reaction. Examples of suitable accelerators are water-soluble persulfates and sodium 2-anthraquinonesulfonate.

In carrying out the treatment, the peroxy compound, the reducing agents, and other assistants are added to the latex while agitating to insure thorough blending. The additives may be introduced into the latex as aqueous solutions, emulsions, or dispersions. Liquid agents, such as cumene hydroperoxide, may be added directly to the latex. The latex is then heated to the desired temperature, and this temperature is maintained until the intrinsic viscosity of the latex has reached the desired value. The reaction mixture is then cooled to room temperature and the cross-linking reaction is stopped by the addition of conventional polymerization arresting materials, such as those disclosed in U.S. 2,576,009. The reaction should be carried out in an inert atmosphere, such as in an atmosphere of nitrogen.

The cross-linking reaction may be carried out between about 30° C. and 100° C. The reaction is accelerated by temperatures in the higher range. However, treatment at the higher temperatures may have a harmful effect on the latex. It is therefore preferred to use temperatures of about 60° C. to about 70° C. as a practical compromise. Below about 30° C. the reaction proceeds too slowly to be practical.

The amount of organic peroxy compound to be used in preparing the cross-linked polymer of component (b) will depend somewhat on the activity of the individual compounds, their molecular weights, etc. In general, the amount will range between 0.1 to 5 parts, by weight, per 100 parts of polymer solids in the latex. The preferred amount ranges from about 0.5 to 1.5 parts by weight of the peroxy compound per 100 parts of polymer solids. It is preferable to use an amount of the reducing agent which is at least an equivalent molar amount based on the peroxy compound.

If the latex to be treated contains short-stopping agents, the effect of these agents must be overcome before the cross-linking reaction may proceed. This may be accomplished either by adjusting the pH of the latex to about 7.5 to 8.5, or by adding a sufficient amount of the redox system to overcome the effect of the polymerization-arresting materials. Alternatively, an inexpensive oxidizing agent such as hydrogen peroxide may be added to destroy the effect of the short-stopping materials. If a short-stopped latex has aged for some time, the effect of the short-stopping agent is less potent than in freshly prepared latex.

It has been found that in order for the blends of the invention to have good working properties, it is essential that component (b) be cross-linked to a certain critical degree. This critical value is determined by measuring the intrinsic viscosity of the latex by the Vistex method as more particularly described in Example I. See also Industrial and Engineering Chemistry 49, 1710 (1957).

The intrinsic viscosity of the latex before the cross-linking step will depend on the method that has been used in polymerization. A polychloroprene latex that has been prepared in the presence of about 0.24 part of technical dodecyl mercaptan per 100 parts of monomer will have an intrinsic viscosity of about 1.3 to 1.5. When no chain transfer agent is used in the polymerization, the intrinsic viscosity of the resulting latex will be lower.

During the cross-linking treatment the intrinsic viscosity will decrease as cross-linking proceeds. The polymer will be sufficiently cross-linked when its intrinsic viscosity reaches or is less than a certain value, which value will vary depending on whether the polymerization was carried out in the presence of a chain-transfer agent.

The maximum intrinsic viscosity (I.V.) can be expressed by the formula:

$$\text{Maximum I.V.} = 0.20 + \tfrac{5}{6} K$$

where K ranges from 0 to about 0.24 equivalent part by weight of standard mercaptan chain transfer agent per 100 parts by weight of monomer used to prepare the latex.

Thus when the polymerization has been carried out with no chain-transfer agent present, K=0 and the maximum permissible intrinsic viscosity of the cross-linked latex is 0.20.

It has been found that when the polymerization has been carried out in the presence of a chain-transfer agent, the maximum permissible intrinsic viscosity of the cross-linked polymer increases as the degree of modification increases.

Since chain-transfer agents vary in effectiveness, the standard selected in describing this invention is a primary aliphatic mercaptan having an average molecular weight of about 202 to 230. These mercaptans have the general formula R—CH$_2$—SH, in which R is an acyclic aliphatic hydrocarbon radical containing 11 to 13 carbon atoms, such as dodecyl mercaptan or tetradecyl mercaptan. Mercaptan of this general formula will be referred to hereinafter as "standard mercaptan." The maximum degree of modification permissible in the polymer corresponds to that produced by about 0.24 part by weight, per 100 parts of monomer, of the standard mercaptan. If the polymer is more highly modified than this, it becomes more difficult to cross-link it, and there is thus no advantage to be gained in using a more highly modified polymer.

The term used in the formula "equivalent parts by weight of standard mercaptan" means the number of parts by weight of standard mercaptan equivalent in modifying effect to the parts by weight of the chain transfer agent actually used.

If the chain transfer agent used is a mercaptan of the general formula R—CH$_2$—SH, where R represents an acyclic hydrocarbon radical having 3 to 17 carbon atoms, the same degree of modification will be produced as the standard mercaptan when used in equivalent molar amounts. Therefore, if 0.10 part of butyl mercaptan (M.W. 90) were used, this would correspond to about 0.24 part of standard mercaptan (M.W. about 215). The "dodecyl mercaptan" of commerce usually refers to a mixture of mercaptans of this type prepared from technical lauryl alcohol. The resulting mercaptan will have the following typical average composition, by weight: 3% 1-decanethiol; 61% 1-dodecanethiol; 23% 1-tetradecanethiol; 11% 1-hexadecanethiol; and 2% 1-octadecanethiol. While the composition may vary slightly from batch to batch, the average molecular weight will not vary greatly and so the effect of the mercaptan is essentially constant. For example, the average molecular weight of the mercaptan mixture having the above composition is about 215. The mercaptan mixture usually referred to as dodecyl mercaptan is the preferred chain-transfer agent to be used in preparing the polymers of this invention because of its ready availability. It will be referred to hereinafter as "technical dodecyl mercaptan." Other modifying agents of the same general type include butyl mercaptan, octyl mercaptan, and octadecyl mercaptan. Other chain-transfer agents include tert-dodecyl mercaptan, dialkyl xanthogen disulfides, and iodoform.

The degree of modification produced in the polymer by the chain transfer agent is determined by measurement of the intrinsic viscosity of the latex. The modifying effect of a modifying agent other than the standard mercaptan is considered to be equivalent to that of the standard mercaptan when a latex prepared in the presence of the alternative modifying agent has essentially the same intrinsic viscosity as the latex prepared in the presence of the standard mercaptan. For example, a latex is prepared using 0.24 part of technical dodecyl mercaptan, and the intrinsic viscosity is measured. To determine the quantity of tert-dodecyl mercaptan that would produce an equivalent modifying effect, one carries out polymerizations using varying amounts of tert-dodecyl mercaptan. The amount of tert-dodecyl mercaptan which produces a latex of essentially the same intrinsic viscosity as the latex prepared in the presence of 0.24 part of technical dodecyl mercaptan is considered to have an equivalent modifying effect.

The relationship of maximum permissible intrinsic viscosity of this cross-linked polymer to the degree of modification is clearly shown by the formula. As the degree of modification increases to that degree produced by about 0.24 part of the standard mercaptan, the maximum permissible intrinsic viscosity increases in a straight-line relationship to a permissible maximum intrinsic viscosity for any degree of modification up to that produced by 0.24 part by weight of the standard mercaptan.

It has been found that when the cross-lnked polymers of component (b) prepared as described above are blended with a conventional solid, benzene-soluble polymer of component (a) in certain proportions, the resulting blends have exceptionally good working properties. These proportions of the cross-linked polymer in the blend range from about 20 percent to 80 percent by weight. When the blend contains less than about 20 percent or more than about 80 percent of the cross-linked polymer, the working properties of the composition tend to be unsatisfactory. The preferred amount of the cross-linked polymer in the blend ranges from 40 to 55 percent by weight.

*Component (c).*—Optionally, a third component, in amount up to 15 percent, based on total weight of the composition, may be used in preparing the blends of this invention. This third component is a benzene-soluble, fluid chloroprene polymer which may be prepared in a manner similar to that used in the preparation of component (a) except that the polymerization is carried out in the presence of a larger amount of a modifying agent, preferably an alkyl mercaptan having 4 to 18 carbon atoms in the alkyl radical. The polymerization may be stopped before polymerization is complete or allowed to go to 100 percent monomer conversion. By fluid chloroprene polymer is meant a chloroprene polymer having an intrinsic viscosity of the isolated polymer in benzene at 30° C. not greater than 0.15. Its benzene-solubility may be determined in the same way as described above for the polymers of a component (a). The presence of this third component improves the smoothness of the extrudate prepared from the elastomer composition of this invention. More than 15 percent of this component causes an undesirable loss of tensile strength in the final vulcanizate.

The blending of the components of the elastomeric composition of this invention is conveniently carried out by mixing the latices and then isolating the blend by conventional methods such as by coagulation, by freezing (as described in U.S. Patent 2,187,146) or by drum drying (as described in U.S. Patent 2,914,497). It is also possible first to isolate the individual components by conventional methods and then to mix the isolated polymers by mechanical means, such as by milling or by working in an internal mixer such as a Banbury or Werner-Pfleiderer mill.

The compounding of the elastomers of this memorandum is like that of the conventional polychloroprenes, as described in "The Neoprenes," published in 1953 by E. I. du Pont de Nemours and Co. In the examples, a fairly high loading of clay is used, as is customary in making tubing and other extruded articles, but the elastomeric compositions may also be used to advantage in gum stocks reinforced with carbon black. Waxes, oils, and other softeners and lubricants may in general, be used, but large amounts are not necessary. When the optional fluid chloroprene polymer is present in the blend, reduced amounts of these oils and softeners are used. The use of oils and softeners in the blend improves the smoothness of the extrudates and lowers the bulk viscosity of the blend, but has a tendency to lower the tensile properties of the vulcanizate.

EXAMPLE I

*Preparation of Benzene-Soluble Component (a)*

A chloroprene polymer latex is prepared using the following recipe:

| | Parts by weight |
|---|---|
| Chloroprene | 97 |
| 2,3-dichloro-1,3-butadiene | 3 |
| Technical dodecyl mercaptan | 0.24 |
| Disproportionated rosin | 3 |
| Water | 109 |
| Sodium hydroxide (100%) | 0.55 |
| Sodium salt of a condensation product of a formaldehyde and naphthalenesulfonic acid | 0.40 |
| Sodium sulfite | 0.30 |

The catalyst solution has the following composition:

| | Parts by weight |
|---|---|
| Water | 4.0 |
| Potassium persulfate | 0.10 |
| Sodium 2-anthraquinonesulfonate | 0.005 |

Polymerization is carried out at 40° C. by addition of the catalyst solution to the aqueous emulsion of the monomer at a rate to give a rise in specific gravity of about 0.0005 g./cc./min. A nitrogen atmosphere is maintained in the polymerization vessel. When monomer conversion reaches about 70%, polymerization is stopped by the addition of a stabilizer emulsion having the following composition:

| | Parts by weight |
|---|---|
| Water | 0.42 |
| Sodium lauryl sulfate | 0.04 |
| Sodium salt of formaldehyde-naphthalenesulfonic acid condensate | 0.014 |
| Toluene | 0.90 |
| Phenothiazine | 0.014 |
| 4-tert-butylcatechol | 0.014 |

Unreacted monomer is removed in a turbannular stripper as described in U.S. 2,467,769. A 2-gram sample of the isolated polymer dissolves in 250 ml. of benzene at room temperature in 5–10 hours with mild agitation. The solid polymer has a Mooney viscosity ML 1+2.5 at 100° C. of 45–54. The polymer content of the latex is about 37% by weight.

*Preparation of Cross-Linked Component (b)*

A chloroprene polymer latex is prepared in a manner essentially identical to that described under component (a) except that the monomer used consists of 100 parts of chloroprene and short stopping is accomplished by adding 2 grams, per 100 parts of original monomer, of an emulsion containing 1% by weight of 4-tert-butylcatechol. The polymer content of the latex is 31.7 percent. To 100 grams of the latex is added 0.77 gram of cumene hydroperoxide (70% active ingredient) emulsified with 0.77 gram of water and 0.02 gram of sodium lauryl sulfate and 0.77 gram of sodium formaldehyde sulfoxylate ($NaHSO_2 \cdot CH_2O \cdot 2H_2O$) in 3.7 ml. of water. This gives the following composition per 100 parts of polymer solids:

| | Parts by weight |
|---|---|
| Polymer solids | 100 |
| Cumene hydroperoxide (100%) | 1.70 |
| Sodium formaldehyde sulfoxylate (anhydrous basis) | 1.86 |

The latex is then acidified to a pH of 7.5 by adding 3.1 ml. of 10% acetic acid, the latex is heated to 60° C., and this temperature is maintained for 24 hours while stirring. Throughout the reaction an atmosphere of nitrogen is maintained in the reaction vessel. The reaction is stopped by adding an emulsion containing 0.4 gram of 4-tert-butylcatechol and 3.3 grams of 2,6-di-tert-butyl-4-phenylphenol. The intrinsic viscosity of the latex is 0.22.

Intrinsic viscosity measurements in this and the following examples are made by weighing 1 gram of latex into a tared bottle containing 25 ml. of a mixture consisting of, by volume, 80 parts of benzene and 20 parts of pyridine. The bottle is agitated on a reciprocating agitator for 10 minutes and weighed. To the bottle is then added 25 ml. of a solution consisting of, by volume, 30 parts of benzene and 70 parts of pyridine. This combination of solvents results in a mixture of 55 parts of benzene and 45 parts of pyridine. A solution of this same composition is used in making subsequent dilutions. In order to correct for the presence of variable amounts of water, empirical correction curves are plotted for the change in time of flow caused by addition of different amounts of water. One such curve is made for each group of viscometer tubes having similar $t_0$ values. When calculating the intrinsic viscosity the water content of the benzene/pyridine solution is calculated and $t_0$ is corrected by adding the factor as determined by the calibration curve. Intrinsic viscosities are obtained using an Ostwald-Fenske-Cannon viscometer at 30±1° C.

*Preparation of Fluid Polymer Component (c)*

A fluid chloroprene polymer is prepared using an aqueous emulsion of the following composition:

| | Parts by weight |
|---|---|
| Chloroprene | 100 |
| Technical dodecyl mercaptan | 5 |
| Disproportionated rosin | 4 |
| Water | 100 |
| Sodium hydroxide (100%) | 0.65 |
| Sodium sulfite | 0.30 |
| Sodium salt of formaldehyde-naphthalenesulfonic acid condensate | 0.50 |

The catalyst solution has the following composition:

| | Parts by weight |
|---|---|
| Water | 7.48 |
| Potassium persulfate | 0.02 |
| Sodium 2-anthraquinonesulfonate | 0.001 |

Polymerization is carried out at 40° C. by addition of the catalyst solution to the monomer emulsion at a rate to give a rise in specific gravity of about 0.0005 g./cc./min. Polymerization is allowed to proceed to 90–100 percent monomer conversion and the polymer emulsion is stabilized by addition of an emulsion of the following composition:

| | Parts by weight |
|---|---|
| Water | 0.60 |
| Sodium lauryl sulfate | 0.057 |
| Sodium salt of formaldehyde-naphthalenesulfonic acid condensate | 0.02 |
| Phenothiazine | 0.02 |
| 4-tert-butylcatechol | 0.02 |
| Toluene | 1.28 |

A sample of the isolated polymer has an intrinsic viscosity of 0.12 (determined in benzene at 30° C.).

*Preparation of Blends*

The blends are prepared by mixing the component latices in a proportion to give the designated polymer content. The mixture of latices is acidified by the addition of 10 percent acetic acid to give a pH of 6 and isolated by freezing in a thin layer on a rotating drum at −15° C., removing the polymer as a continuous sheet, washing with water, and drying.

A blend having the following composition is prepared for testing:

| | Parts by weight |
|---|---|
| Benzene-soluble component (a) | 52 |
| Cross-linked component (b) | 48 |
| Fluid polymer component (c) | 6.4 |

In quantitatively evaluating the working properties of the elastomers of this invention a value designated as "die swell" is determined as follows:

The compounded stock is extruded through a 2-inch Royle extruder using a Garvey die. The compounded stock is warmed on a mill and fed to the extruder in strips.

The temperature conditions of the extruder are as follows:

| | °C. |
|---|---|
| Zone 1 | 88 |
| Zone 2 | 82 |
| Zone 3 | 71 |
| Die | 93 |
| Worm | 21–27 |

The speed of the worm is 35 r.p.m. The extrudate is taken from the extruder in two lengths. The length and weight of the extrudate are measured, and from these the weight in grams per inch of the extrudate is calculated. This value, which is designated as the "die swell," is a measure of the good processability of an elastomer. A high numerical value for die swell indicates a high "elastic memory" in the elastomer, i.e., the length of the extrudate has contracted with a consequent increase in weight per inch. The lower the number for the die swell, the better are the working properties of the polymer. The unblended benzene-soluble polymers of component (a) have die swells ranging from about 2.00 to 2.4. Therefore, a die swell of 2.0 or greater would indicate that a blend has essentially no improvement in working properties over the benzene-soluble component (a).

The extrudates are also examined visually for smoothness and die definition (feather edge).

The compounding recipe used in the test is as follows:

| | Parts by weight |
|---|---|
| For extrusion: | |
| Polymer or polymer blend | 100 |
| Magnesium oxide | 4 |
| N-phenyl-1-naphthylamine | 1 |
| Stearic acid | 0.5 |
| Clay | 90 |
| Light process oil | 12 |
| Paraffin wax | 1 |
| Petrolatum | 1 |

If the compounded stock is to be cured, 5 parts of zinc oxide and 0.5 part of 2-mercapto-2-imidazoline are added and samples are cured in a mold in a press for 30 minutes at 153° C. The tensile properties are measured at 25° C. by ASTM Method D-412–51T.

A blend is prepared as described above, compounded and extruded. For comparison an unblended chloroprene polymer is also evaluated. The latter is prepared in the same manner as component (a) except that 100 parts of chloroprene are used as the monomer and the polymer content of the latex is 37% by weight. Table I shows the data:

TABLE I

| | Blends of This Example | Unblended Polymer |
|---|---|---|
| Die swell, g./in | 1.86 | 2.17. |
| Feather edge | Slightly torn | Torn. |
| Smoothness | Fairly smooth | Rough and grainy. |

When blends are prepared consisting of 80 parts by weight of component (a) and 20 parts by weight of the cross-linked component (b), the resulting extrudate has a die swell of about 1.90–1.95.

When blends are prepared consisting of 20 parts by weight of component (a), 80 parts by weight of the cross-linked component (b) and 8 parts by weight of fluid polymer component (c), the die swell of the resulting extrudate is about 1.86.

EXAMPLE II

A latex is prepared in the same way as component (b) of Example I except as stated. The polymerization is carried to a 95% conversion. No shortstopping agent is added to the latex. The latex contains 46.5% of polymer solids. To 100 grams of the latex is added 0.5 gram of cumene hydroperoxide (70%), 0.5 gram of sodium formaldehyde sulfoxylate (dihydrate), 0.127 gram of sodium 2-anthraquinonesulfonate and 0.127 gram of potassium persulfate. The cumene hydroperoxide is added directly to the latex with vigorous agitation and the other ingredients are added as aqueous solutions. An atmosphere of nitrogen is maintained in the reaction vessel. The recipe based on polymer solids is:

| | Parts by weight |
|---|---|
| Solid polymer | 100 |
| Cumene hydroperoxide (100%) | 0.75 |
| Sodium formaldehyde sulfoxylate (anhydrous) | 0.83 |
| Sodium 2-anthraquinonesulfonate | 0.273 |
| Potassium persulfate | 0.273 |

The resulting composition is held at 60° C. for 20 hours. The reaction is then stopped by addition of an emulsion containing 1 part of 2,6-di-tert-butyl-p-phenylphenol per 100 parts of polymer. The intrinsic viscosity of the treated latex is 0.23. A blend is prepared as described in Example I using the above as component (b) which when compounded and extruded has a die swell of 1.91.

EXAMPLE III

A latex is prepared in the same way as the latex for component (b) in Example I except that the monomer charge by weight is 97 parts chloroprene and 3 parts 2,3-dichloro-1,3-butadiene and that conversion is carried to 88%. No shortstop is added. The polymer content of the latex is about 38.5 percent. The latex is treated in the same way as described in Example II except that twice as much potassium persulfate is added and the reaction is stopped by adding 1.7 grams of an emulsion having the same composition as the shortstop emulsion used in preparing component (a) of Example I.

The recipte based on 100 parts of solid polymer is:

| | Parts by weight |
|---|---|
| Polymer solids | 100 |
| Cumene hydroperoxide (100%) | 0.91 |
| Sodium formaldehyde sulfoxylate (anhydrous) | 1.0 |
| Sodium 2-anthraquinonesulfonate | 0.33 |
| Potassium persulfate | 0.66 |

The final latex has an intrinsic viscosity of 0.30. When this latex is used as component (b) in preparing a blend as described in Example I, the blend has a die swell of 1.96.

EXAMPLE IV

Two different latices are prepared using the same recipe as used in preparing the latex of component (b) of Example I except that only 0.12 part of technical dodecyl mercaptan is used and no shortstop is added after polymerization. In preparing one latex (Latex I) the polymerization is allowed to proceed to 75% conversion and excess monomer is removed by stripping in a turbannular stripper. In preparing the other latex (Latex II) polymerization is carried to 95% conversion and monomer is not stripped. Latex I contains 36.9% polymer solids and Latex II contains 44.3% of polymer solids.

A sample of 200 parts of each latex is treated with the following:

| | Parts by weight |
|---|---|
| Cumene hydroperoxide (70%) | 0.5 |
| Sodium formaldehyde sulfoxylate (dihydrate) | 1.0 |
| Sodium 2-anthraquinonesulfonate | 0.25 |
| Potassium persulfate | 0.25 |

This gives a recipe, based on 100 parts of polymer solids of:

|  | parts by weight | |
|---|---|---|
|  | Latex I | Latex II |
| Polymer solids | 100 | 100 |
| Cumene hydroperoxide (100%) | 0.95 | 0.79 |
| Sodium formaldehyde sulfoxylate (anhydrous) | 2.07 | 1.73 |
| Sodium 2-anthraquinonesulfonate | 0.68 | 0.56 |
| Potassium persulfate | 0.68 | 0.56 |

The mixture is maintained at 60° C. for 2 hours. A nitrogen atmosphere is maintained in the reaction vessel. Reaction is stopped by adding 1.7 grams of an emulsion having the same composition as the shortstop emulsion used in preparing component (a) of Example I.

The intrinsic viscosities of the two resulting compositions are:

Latex I _____ 0.42
Latex II _____ 0.21

Each of these latices is used as the cross-linked component (b) in preparing blends as described in Example I above using the benzene-soluble component (a) of Example I.

The die swell of the extrudates are found to be:

TABLE II

|  | Die swell (g./in.) |
|---|---|
| Blend containing Latex I | 2.00 |
| Blend containing Latex II | 1.79 |

By referring to the formula I.V.=0.20+⅝K, it can be seen that the maximum intrinsic viscosity of the treated polymer, which has been prepared in the presence of 0.12 part of the standard mercaptan (per 100 parts of monomer) is 0.30. The latex cross-linked to an intrinsic viscosity of 0.42 yields blends having no appreciable improvement in working properties over the working properties of an unblended benzene-soluble component (a). On the other hand, the latex which is cross-linked to an intrinsic viscosity of 0.21 shows substantial improvement in working properties.

EXAMPLE V

The preparation of the two cross-linked component (b) latices (I and II) of Example IV is repeated except that no standard mercaptan chain transfer agent is used in the preparation of either. Blends I and II containing latices I and II respectively as cross-linked component (b) are prepared revealing the following pertinent information:

TABLE III

|  | I.V. of treated Latex | Die Swell (g./in.) |
|---|---|---|
| Blend containing Latex I | 0.18 | 1.92 |
| Blend containing Latex II | 0.16 | 1.87 |

According to the formula, when component (b) contains no chain transfer agent the maximum I.V. is 0.20. Both latices I and II of this example are below this maximum and as indicated by the results in Table III both have good working properties.

EXAMPLE VI

Cross-linked component (b) is prepared by adding 8.0 grams of cumene hydroperoxide (70%) to 2,000 grams of a latex described for use in preparation of component (b) in Example I having a polymer solids content of 38.8%. The latex is heated to 60° C. and 22.0 grams of $K_4Fe(CN)_6 \cdot 3H_2O$ is added in 100 ml. of water. An atmosphere of nitrogen is maintained in the reaction vessel. Temperature is maintained at 60° C. for 18 hours. The latex is cooled to room temperature and the reaction is stopped by adding 20 grams of an emulsion having the same composition as that used in preparing component (a) of Example I. The latex has an intrinsic viscosity of 0.21.

The ratio of treating agents per 100 parts of polymer solids is:

|  | Parts by weight |
|---|---|
| Polymer solids | 100 |
| Cumene hydroperoxide (100%) | 0.72 |
| $K_4Fe(CN)_6$ (anhydrous) | 2.47 |

A benzene-soluble chloroprene polymer is prepared for component (a) in a manner identical to the preparation of component (a) of Example I except that the monomer is 100 parts of chloroprene and the polymer content of the latex is 37% by weight. A blend is prepared in the manner described in Example I having the following composition:

|  | Parts by weight |
|---|---|
| Component (a) of this example | 50 |
| Cross-linked component (b) of this example | 50 |
| Fluid polymer component (c) of Example I | 5.3 |

When the blend is compounded and extruded, the die swell is found to be 1.66.

EXAMPLE VII 750 grams of the latex used for preparation of component (b) in Example I is weighed into a one-quart jar. 4.1 grams of sodium formaldehyde sulfoxylate dihydrate is added as a 14.2 percent solution. The pH is adjusted to 8.5 by addition of a 10 percent solution of acetic acid. An atmosphere of nitrogen is maintained in the reaction vessel. The latex is heated to 60° C., and there is added 12.5 grams of a 25 percent solution of acetyl peroxide in dimethyl phthalate, which solution has been emulsified in 25 ml. of water containing 2 percent of sodium lauryl sulfate. The recipe based on 100 parts by weight of polymer is:

|  | Parts by weight |
|---|---|
| Polymer solids | 100 |
| Acetyl peroxide (100%) | 1.32 |
| Sodium formaldehyde sulfoxylate (anhydrous) | 1.32 |

The reaction is allowed to proceed at 60° C. for 6 hours. At the end of this time the reaction is stopped by adding 15.5 grams of an emulsion prepared by dissolving 40 grams of 2,6-di-tert-butyl-4-phenylphenol in 105 grams of benzene and emulsifying this with 100 ml. of water containing 5 grams of sodium lauryl sulfate. The mixture is cooled in ice. The treated latex has an intrinsic viscosity of 0.32. A blend is prepared, compounded, and extruded as described in Example I above, using the benzene-soluble component (a) and the fluid polymer component (c) of Example I. The die swell of the extrudate is 1.84.

The cured stock has the following tensile properties:

| Tensile strength at the break, p.s.i. | 1960 |
|---|---|
| Elongation, percent | 760 |
| Modulus at 300 percent elongation, p.s.i. | 720 |

EXAMPLE VIII

Example VII is repeated except that benzoyl peroxide is used instead of acetyl peroxide. 6.2 grams of sodium formaldehyde sulfoxylate dihydrate is added to the latex, and an emulsion containing 9.2 grams of benzoyl peroxide is added after the temperature is raised to 60° C.

The recipe used, based on 100 parts of polymer solids is:

|  | Parts by weight |
|---|---|
| Polymer solids | 100 |
| Benzoyl peroxide | 3.88 |
| Sodium formaldehyde sulfoxylate (anhydrous) | 2.00 |

The treated latex has an intrinsic viscosity of 0.37 and the polymer blend, when compounded and extruded, has a die swell of 1.89.

If in the preparation of the benzene-soluble component (a) and in the preparation of the fluid polymer component (c) of Example I, up to about 50% by weight, based on total weight of monomer, of another ethylenically unsaturated monomer is copolymerized with the chloroprene monomer, blends having satisfactory working properties will still be obtained. Likewise, if in the preparation of cross-linked component (b) of Example I, up to about 10% by weight, based on total weight of monomer, of another ethylenically unsaturated monomer is copolymerized with the chloroprene monomer, satisfactory blends will still be produced.

However, the following will illustrate a relatively unsatisfactory material produced by operating outside the scope of the invention:

A cross-linked chloroprene polymer is prepared in essentially the same manner as component (b) of Example I except that no technical dodecyl mercaptan is included in the recipe and the monomer is polymerized to 100 percent conversion. The polymer latex is not subsequently treated with the redox system and the intrinsic viscosity is found to be 0.23. A blend is made of this polymer with components (a) and (c) of Example I in the manner and amounts as described therein. When the blend is compounded, extruded and evaluated as described in Example I it is found that the die swell is 2.44 grams per inch, which is no better than an unblended, benzene-soluble polymer. It is to be noted that the intrinsic viscosity of the cross-linked component of 0.23 exceeded the maximum I.V. of 0.20 calculated by the formula (since, in this case no chain transfer agent was used).

The elastomer compositions of this invention display exceptionally good extrudability. They may be processed in any form of rubber-working equipment, such as internal mixers, compounding mills, calenders, extruders and the like, and used in fabricating tires and mechanical goods of all kinds, coated fabrics, tubing, coated wire, and extruded gaskets.

As many widely different embodiments of this invention may be made without departing from the spirit and scope thereof, it is to be understood that this invention is not limited to the specific embodiments thereof except as defined in the appended claims.

What is claimed is:

1. A process for preparing an easily-processable elastomeric blend which comprises: (1) preparing a cross-linked polymer of chloroprene by (a) polymerizing chloroprene monomer with no more than 10% by weight, based on total weight of monomer, of another ethylenically unsaturated monomer copolymerizable therewith selected from the group consisting of monoolefinic compounds and conjugated diolefinic compounds, in aqueous emulsion to produce a polymer in latex form, (b) cross-linking said polymer latex by reaction at a temperature between 30° and 100° C. with an organic peroxy compound and a reducing agent, the maximum intrinsic viscosity (I.V.) of said cross-linked polymer latex being expressed according to the formula:

$$\text{Maximum I.V.} = 0.20 + \tfrac{5}{6} K$$

wherein K ranges from 0 to about 0.24 equivalent part by weight of standard mercaptan chain transfer agent per 100 parts by weight of monomer used to prepare said latex; and (2) blending the cross-linked polymer obtained from step (1) with a solid, benzene-soluble chloroprene polymer in a weight basis ratio between about 1:4 and about 4:1.

2. A process as defined in claim 1 wherein a fluid, benzene-soluble chloroprene polymer having an intrinsic viscosity no greater than about 0.15 is incorporated into the blend in an amount no greater than about 15 percent based on the total weight of the blend.

3. A process according to claim 2 wherein the ratio of solid, benzene-soluble polymer to cross-linked polymer on a weight basis is between about 3:2 and about 9:11.

4. A process according to claim 1 wherein the organic peroxy compound is cumene hydroperoxide and the reducing agent is sodium formaldehyde sulfoxylate.

5. A process according to claim 2 wherein the ratio of solid, benzene-soluble polymer to cross-linked polymer on a weight basis is between about 3:2 and about 9:11.

References Cited in the file of this patent

UNITED STATES PATENTS

| | | |
|---|---|---|
| 2,763,635 | Tucker et al. | Sept. 18, 1956 |
| 2,802,891 | Feild et al. | Aug. 13, 1957 |
| 2,845,411 | Willis | July 29, 1958 |
| 3,042,652 | Pariser et al. | July 3, 1962 |